A. O'NEILL.
PIPE-CONNECTIONS.
No. 180,911. Patented Aug. 8, 1876.
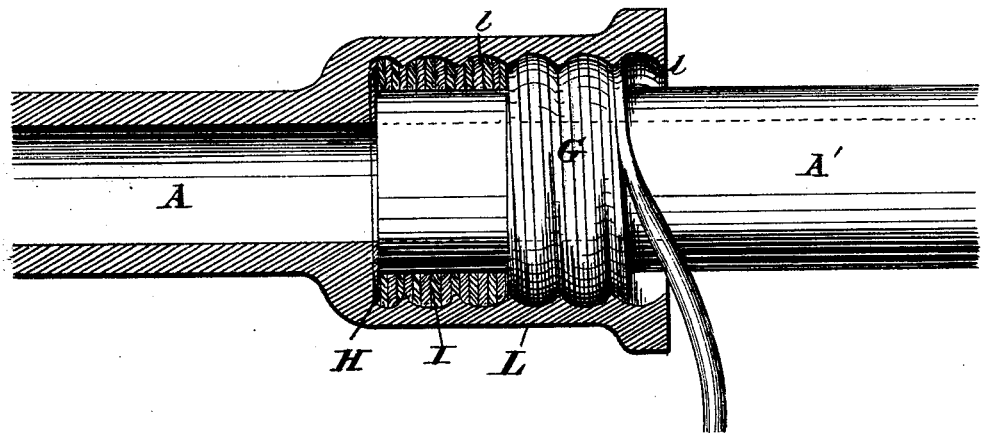
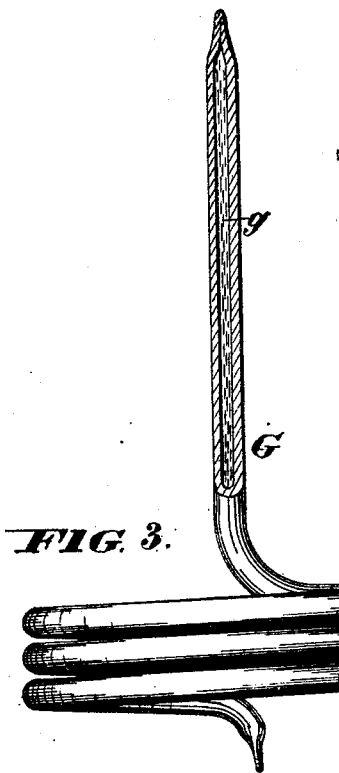
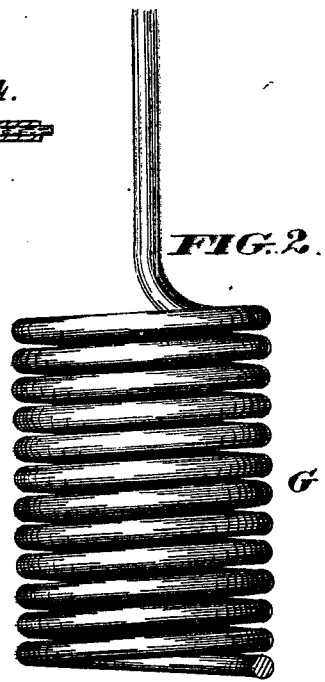
WITNESSES
Chas J. Gooch
L. Blond. Burdett
INVENTOR
Andrew O'Neill
By Knight Bros Attorneys.

UNITED STATES PATENT OFFICE.

ANDREW O'NEILL, OF BALTIMORE, MARYLAND.

IMPROVEMENT IN PIPE-CONNECTIONS.

Specification forming part of Letters Patent No. 180,911, dated August 8, 1876; application filed February 23, 1876.

*To all whom it may concern:*

Be it known that I, ANDREW O'NEILL, of Baltimore, in the State of Maryland, have invented a certain new and useful Mode of Connecting Water and other Pipes, of which the following is a specification:

My invention consists, first, in the employment of a rope or heavy wire of lead, constructed, as hereinafter described, for the calking of the joints in water and other pipes.

The invention consists, further, in the combination of a pipe end, an inclosing bell within which the said pipe end is introduced, and a calking of cold lead, applied, as hereinafter described, in the annular space between the pipe end and bell, to form an air or water tight joint.

The invention further consists in the combination of an end gasket and pipe, end inclosing-bell and a cold-lead calking, substantially as herein set forth.

The invention further consists in a peculiar construction of gasket adapted for application at the end of the pipe within the bell to form a tight joint in connection with a calking around it.

In the accompanying drawings, Figure 1 shows a longitudinal section of the bell end of the pipe and an elevation of the cylindrical end of the adjoining section, with a fibrous packing in section, and the cold-lead calking in elevation. Fig. 2 is an elevation of a coil of cold-lead calking. Fig. 3 is an elevation, partly in section, illustrating a modification in the construction of the calking. Fig. 4 is a section of the end gasket.

A A' are parts of two adjoining sections of a water-pipe, L being the bell end of the section A, within which the cylindrical end of the section A' is introduced. H is an annular gasket, applied to the seat at the base of the bell L, to receive the end of the section A'. I represents a body of hemp or other fibrous packing, which is calked into the base of the annular space between the pipe A' and the bell L. G is a body of lead rope, which is supplied in coils, as illustrated in Fig. 2, and is applied around the cylindrical end of the pipe within the cavity of the bell, filling the annular space between them, and is tightly tamped or driven in, coil after coil. The interior of the bell is preferably formed with recesses $l$ for the reception of the cold-lead calking G. The end gasket H, at the base of the bell, is formed of paper or other material adapted to expand under the influence of moisture, and is provided on its inner edge with an eyelet, $h$, of lead. This end packing and the annular calking applied from end to end of the joint form together a much more secure joint than the ordinary hot-lead calking, as each ring of the lead rope is firmly packed home in succession.

Red lead may be smeared on each side of the joint previous to calking, forming a hard packing when dry.

As a substitute for the solid lead rope I sometimes employ the appliance shown in Fig. 3, consisting of lead pipe G, filled with litharge or other fluid or semi-fluid packing material $g$, or any suitable chemical to form a tight joint. In this case the calking operation bursts the lead pipe, causing the material therein contained to exude and adhere to both faces of the joint. The pipe may be perforated, if preferred.

My improved system of forming joints in main and service pipes possesses many advantages over the old mode. Hot-lead joints being entirely dispensed with avoids the necessity for wide excavations, and the time and labor usually occupied in making fire and melting lead and running it into the joints.

My improved mains may be laid in trenches one-half the width of those required to manipulate common pipe, thus greatly reducing the cost and labor of excavating, refilling, and repaving, and especially effecting an enormous saving in laying pipes in rock, which is a consideration of great importance in some cities.

Dispensing with the use of fire and hot lead in forming the joints adapts my system for the laying of pipes in water without difficulty. Hydraulic cement may be run around the joints for additional security.

With my system of joining pipes, the strains applied being longitudinal, instead of radial or expansive, much of the metal required to re-enforce the bell with the old style of couplings is dispensed with.

Having thus described my invention, the following is what I claim as new and desire to secure by Letters Patent—

1. The lead rope herein described, for the cold calking or packing of pipe-joints in the manner explained.

2. The joint or packing constructed, as herein described, of the pipe-end bell and the cold-lead rope calking, applied, in the manner explained, to fill the joint between them.

3. The combination of the end gasket, the bell, the pipe end, and the annular cold-lead calking, applied in the manner described.

4. The gasket, constructed with a body of expansible material and a protecting-eyelet of lead or other suitable material, as and for the purposes set forth.

ANDREW O'NEILL.

Witnesses:
OCTAVIUS KNIGHT,
LE BLOND BURDETT.